United States Patent [19]
Castracane et al.

[11] Patent Number: 6,069,352
[45] Date of Patent: May 30, 2000

[54] INTENSITY CONTROL SYSTEM FOR INTENSIFIED IMAGING SYSTEMS

[75] Inventors: James Castracane; Mikhail A. Gutin, both of Albnay; Lawrence P. Clow, Jr., Waterford, all of N.Y.

[73] Assignee: InterScience, Inc., Troy, N.Y.

[21] Appl. No.: 09/149,691

[22] Filed: Sep. 8, 1998

Related U.S. Application Data

[60] Provisional application No. 60/058,230, Sep. 9, 1997.

[51] Int. Cl.[7] .................................................. H01J 40/14
[52] U.S. Cl. .................................... 250/214 VT; 313/524
[58] Field of Search ............................ 250/214 VT, 207, 250/214 R; 313/524, 527, 528, 529, 534, 537; 315/149

[56] References Cited

U.S. PATENT DOCUMENTS

| | | |
|---|---|---|
| 4,433,236 | 2/1984 | Shimada . |
| 4,695,718 | 9/1987 | Dill . |
| 4,755,725 | 7/1988 | Kastendieck et al. . |
| 4,853,529 | 8/1989 | Meyers . |
| 4,872,057 | 10/1989 | Woolfolk . |
| 4,882,481 | 11/1989 | Gilligan et al. . |
| 5,049,995 | 9/1991 | Shimoni . |
| 5,146,077 | 9/1992 | Caserta et al. . |
| 5,153,424 | 10/1992 | Gramer . |
| 5,248,874 | 9/1993 | Raverdy . |
| 5,336,881 | 8/1994 | Caserta et al. . |
| 5,408,087 | 4/1995 | Thomas .............................. 250/214 VT |
| 5,729,010 | 3/1998 | Pinkus et al. . |

*Primary Examiner*—Que T. Le
*Assistant Examiner*—Kevin Pyo
*Attorney, Agent, or Firm*—Jay R. Yablon; Michelle D. Simkulet

[57] ABSTRACT

An improved intensity control system for an intensified imaging system allows continuous viewing through an intensified imaging system while protecting saturated areas from the negative effects of overexposure. A micromirror array (MMA) is used in conjunction with associated optics to control the intensity incident on the image intensifier. Control circuitry determines if pixel intensity is above or below the preset threshold level. If above, the corresponding elements of the MMA array will deflect the incident light in that specific area thereby eliminating saturation of the pixels. The rest of the image is maintained for continuous viewing. A continuous feedback loop monitors the intensity levels of pixels and actively controls the incident light using the MMA.

19 Claims, 6 Drawing Sheets

6,069,352

INTENSITY CONTROL SYSTEM FOR INTENSIFIED IMAGING SYSTEMS

CROSS-REFERENCE TO RELATED APPLICATIONS

This application claims the benefit of U.S. Provisional Application Ser. No. 60/058,230, filed Sep. 9, 1997.

FIELD OF THE INVENTION

This invention relates to the field of image intensifiers and their control systems, and particularly to the control of the intensity viewed by the image intensifier at the level of individual elements in the field of view as opposed to the entire field of view.

BACKGROUND OF THE INVENTION

Image intensifiers electrically amplify light reflected from a scene in a low light level scenario. They can be integrated into direct viewing systems such as periscopes, monoculars, and night vision goggles or CCD (charge coupled device) imaging systems. In these various formats, intensified imaging systems have both industrial and military applications.

Advances in the design of image intensifier tubes have produced multiple models with varying capabilities, components, and features; for example GEN 0, GEN I, GEN II and GEN III tubes. A problem common to all of the tubes is saturation and potential damage at high light level viewing. An image intensifier works in the following manner. An objective lens collects the incident radiation and focuses it onto the photocathode. The photocathode absorbs this light energy and converts it to electrons. In GEN 0 and GEN I intensifiers these electrons are accelerated towards a phosphor screen maintained at a higher potential than the photocathode. The phosphor screen converts the electron emission to visible light which is significantly amplified by the process. In GEN II and GEN III intensifiers, the electrons generated by the photocathode pass through a microchannel plate (MCP) that multiplies the number of electrons prior to their striking the phosphor screen.

A variety of control systems have been produced with the goal of controlling the brightness detected by the image intensifier tube. Some control systems are limited to a specific generation of tube to which they can be applied. However, the general approach thus far in the prior art is to monitor and control the total intensity impinging on the intensifier tube across the entire scene, and once a designated threshold limit is reached, voltage to the photocathode, and thus sensitivity and spatial resolution, is significantly reduced.

More specifically, the prior art, as described in U.S. Pat. No. 5,135,424, includes a flux monitor circuit which measures the flux of the incident light on the image intensifier tube, as well as an intensity monitor circuit described in U.S. Pat. No. 4,853,529, which measures the intensity of incident light on the image intensifier tube for a preset time period. Both circuits reduce voltage supplied to the image intensifier tube when a threshold value is reached during operation. Additional prior art described in U.S. Pat. Nos. 4,872,057 and 4,882,481 provides various means of on/off gating the duty cycle duration in relation to the incident light in order to control the light level detected by the intensified camera system. Other prior art described in U.S. Pat. No. 5,146,077, utilizes the varying photocathode current to detect excessive incident light. One invention, as described in U.S. Pat. No. 4,695,718, uses the fluctuations in the photocathode current to control a variable density filter placed in front of the photocathode, while another invention uses the varying photocathode current to adjust the photocathode voltage. In yet another prior art invention described in U.S. Pat. No. 4,433,236, the photocathode current is monitored to provide a warning to the operator by means of a blinking on the phosphor screen when a threshold level is reached.

The multitude of prior art in this area concentrates on the protection of the image intensifier tube from excessive incident light by shutting down or reducing the power to the tube for the duration of the saturation. In a variety of both military and industrial situations this procedure could have very negative effects including complete loss of night vision and loss of acquired data. In many instances the excessively bright source comprises only a fraction of the viewed scene.

OBJECTS OF THE INVENTION

Therefore, it is the object of the invention disclosed herein to provide an improved intensity control system for the field of view of an image intensifier in which the intensity level of individual elements within the image are controllable thereby allowing the elimination or reduction of bright, saturated spots for their duration, without eliminating the entire field of view.

It is also an object of the invention to provide such an improved intensity control system for an image intensified CCD camera.

It is also an object of the invention to provide such an improved intensity control system for a direct view image intensifier, such as night vision goggles.

SUMMARY OF THE INVENTION

The present invention provides an improved intensity control system for image intensifiers over the prior art. The incident radiation is initially imaged on a micromirror array (MMA) and subsequently deflected to an intensified imaging system. The intensity of the entire image is monitored pixel by pixel by a monitoring detector in a direct viewing intensified imaging system or the actual (viewing and monitoring) CCD in an intensified CCD imaging system. A predetermined threshold level is used to At monitor the incident intensity level, for each pixel, frame by frame. When certain pixels are detected above the established threshold, a corresponding element in the micromirror array is deflected so that the incident radiation for those specific pixels is deflected away from the intensified imaging system so as to avoid saturation in that area. The control electronics associated with this establishes a continuous feedback loop, and are capable of making the necessary adjustments to the scene within the frame time of the CCD camera so as to maintain real time imaging. The overwhelming advantage of the present invention is that viewing of the scene can be maintained minus the dead spot created by the saturated source.

Alternatively, the present invention can be enhanced so as to adjust the dwell time of the saturated pixel element by deflecting the incident radiation only long enough in the camera frame time to reduce the intensity below the saturation level, thereby maintaining the entire viewed scene. The technique of pulse width modulation accomplishes similar results.

BRIEF DESCRIPTION OF THE DRAWINGS

The features of the invention believed to be novel are set forth in its associated claims. The invention, however, together with further objects and advantages thereof, may best be understood by reference to the following description taken in conjunction with the accompanying drawings in which:

DETAILED DESCRIPTION

Figure 1:
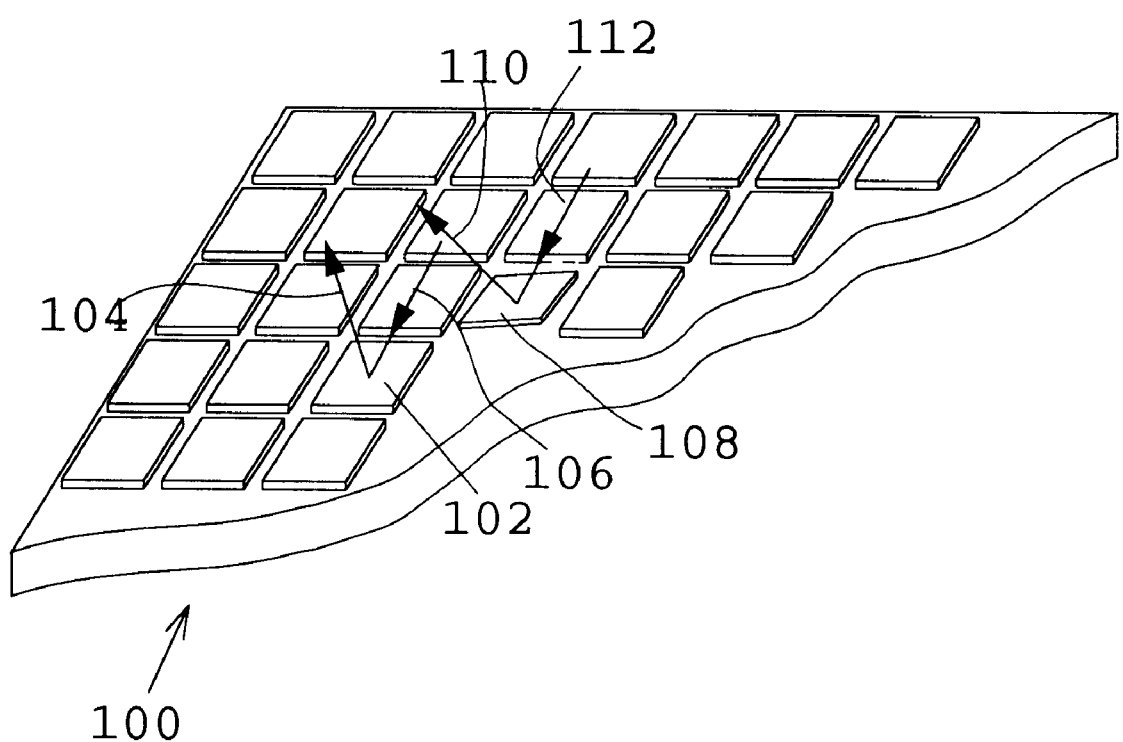
FIG. 1 is an isometric cutaway view of a micromirror array showing its individual micromirror elements' interaction with incident light in both a resting and energized position.

A primary component of the invention presently described is a micromirror array (MMA). Referring to FIG. 1, the MMA, which is known in the prior art as will be further discussed below, is an array of individually controllable micromirrors, 100. A resting state micromirror element 102 provides a normally reflected light wave 104 in response to a first incident light wave 106. Similarly, a deflected micromirror element, such as 108, will provide a deflected light wave, 110 in response to a second incident light wave, 112. As described with reference to FIGS. 2, 3 and 4 below, deflection of the element and thus the lightwave can occur in either a positive or negative direction as compared to the normal of a resting state micromirror 102 element.

Figure 2:
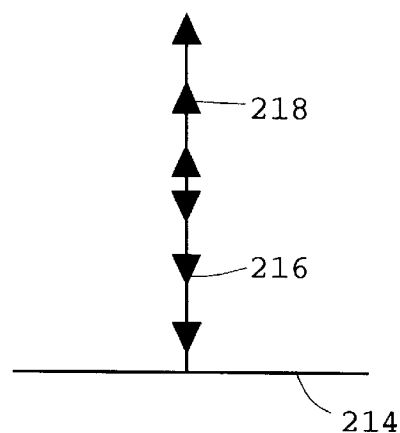
FIG. 2 is a schematic line drawing detailing the propagation of incident light on an individual micromirror array element in its resting (unenergized) position.

The control and reflection properties of the MMA, 100 is further described with reference to FIGS. 2, 3, and 4. FIG. 2 shows a representative micromirror array element 214 in its resting (unenergized) position. A perpendicularly-incident light wave 216 normal to this array element will reflect back along the same axis as a perpendicularly reflected light wave, i.e, along 218. The position of FIG. 2 is shown solely for reference, since once the MMA 100 is powered on (energized), this actual position is not typically used in an optical system.

Figure 3:
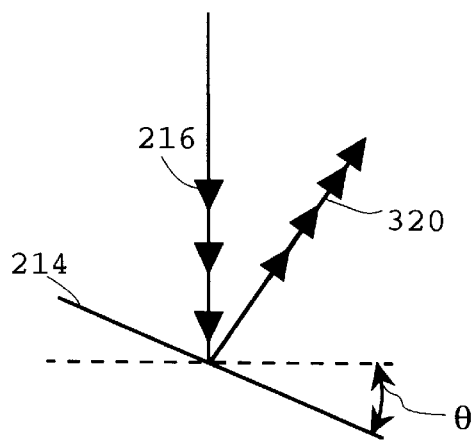
FIG. 3 is a schematic line drawing detailing the propagation of incident light on an individual micromirror array element in its first energized +θ position.

FIG. 3 shows the representative micromirror array element, 214 deflected to a first energized position with a tilt of +θ from its resting (unenergized) position. The perpendicularly-incident light wave 216 will reflect in a different direction, as a first deflected light wave 320.

Figure 4:
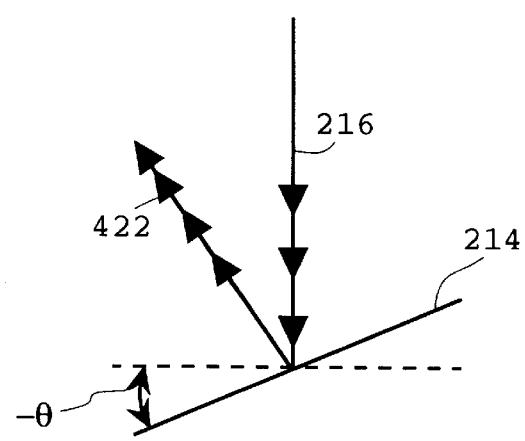
FIG. 4 is a schematic line drawing detailing the propagation of incident light on an individual micromirror array element in its second energized −θ position.

FIG. 4 shows the representative micromirror array element, 214 deflected to a second energized position with a tilt of −θ from its resting (unenergized) position. The perpendicularly-incident light wave 216 will reflect in a different direction, as a second deflected light wave, 422.

Typically, the normal resting state as illustrated by FIG. 2 is not a position used in an optical system design. Most often, the MMA 100 is used in its first energized position as shown in FIG. 3 or in its second energized position as shown in FIG. 4. FIG. 2 is shown here for the purpose of comparison and to establish the resting position from which the deflection is measured.

The MMA employed for this purpose is a well established in the prior art as a packaged array of individually-controlled micromirrors. The control can be analog or digital, however for description purposes that follow, the digital micromirror array design will be described. However, the invention disclosed herein is applicable to both digital and analog micromirror arrays. While there are a variety of configurations of these devices, the basic technology remains the same. The array of micromirrors is formed over an array of individually-addressable electrodes. Each micromirror is supported by at least one hinge device and is controlled by at least one address electrode. There is a definable gap between the address electrode and the micromirror to allow for tilting or deformation of the micromirror. A common configuration is a squared micromirror supported by two hinges at two corners of the micromirror diagonally opposite each other, and controlled by address electrodes at the two remaining corners. Such a dual control system enables the bi-directional tilt or deformation of the micromirror element 214 as shown in FIGS. 3 and 4.

The present invention utilizes technology such as the MMA 100 described above to control the intensity level of specific areas or specific pixels, as part of an intensified imaging system. By utilizing a MMA as a component in such a system as outlined below, only saturated areas of the image are eliminated throughout the duration of their saturation, and the rest of the image remains viewable.

For the description that follows, the following convention will be used. Since the tilting direction of the micromirror array elements 214 is somewhat arbitrary and dependent on the actual optical system layout, the first energized position will always be defined to represent deflection into the optical viewing system. Similarly, the second energized position will always be defined to represent deflection away from the optical viewing system.

Figure 5:
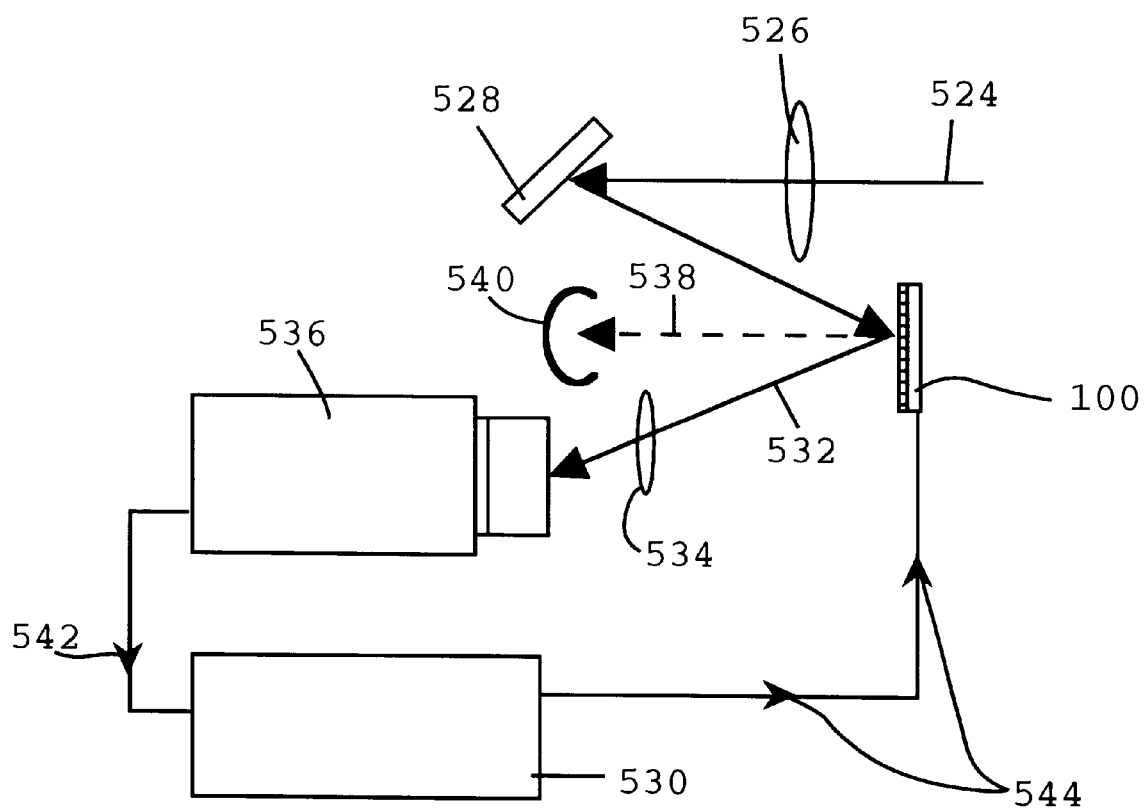
FIG. 5 is an optical schematic showing the propagation of an incident image through the intensity control system specifically for an intensified CCD camera.

The preferred embodiment of the present invention is an improved intensity control system for intensified vision systems. This technology can be applied to both intensified camera systems and intensified direct viewing systems such as night vision goggles. The preferred embodiment as applied to an intensified camera system such as an intensified CCD camera system is shown in FIG. 5.

Incident light 524 is imaged by input optics 526 onto the surface of the MMA 100 by way of reflectance off of mirrored surface 528. The position of the individual micromirror array elements is controlled by control module 530. Initially, all elements are set to their first energized position and the image is directed along lightpath 532 through the output optics 534 and onto the intensified CCD camera 536. The control module 530 determines the saturated image areas by analyzing the pixel by pixel output (542) of the intensified CCD camera 536 and energizes (544) the corresponding MMA elements to deflect the saturated areas of the image along lightpath 538 to a light trap 540. A light trap can be instituted in a variety of ways and can be made from many materials. It must have the tendency to absorb light and not reflect it, and it is often shaped so as to internally direct any reflections that do occur. Any saturated areas of the image determined to be above the threshold level set in the control module 530, can be deflected away from the output optics 534 along lightpath 538 as indicated to a light trap 540, by energizing the corresponding elements of the MMA 100 to the second energized position as described above.

Figure 6:
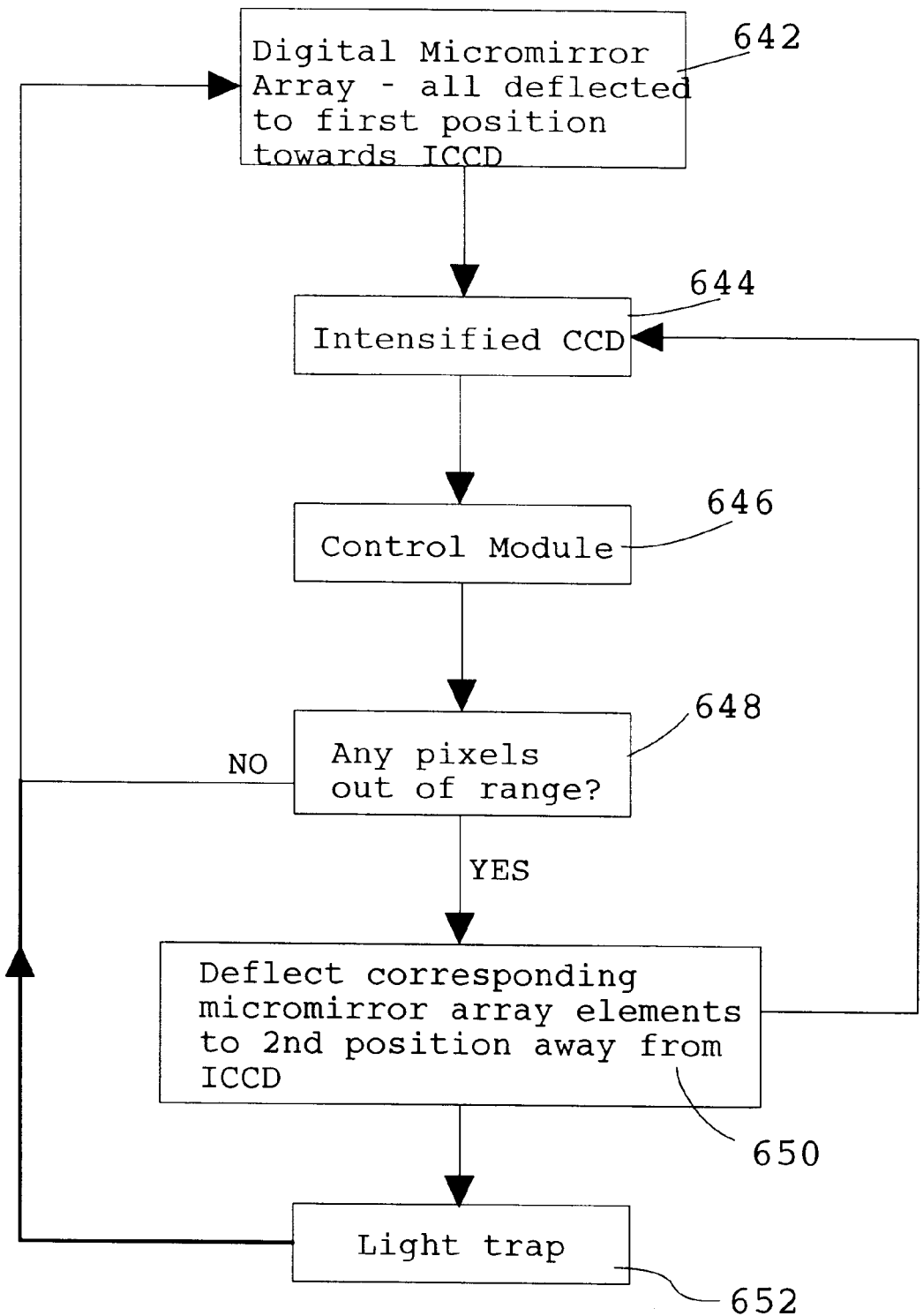
FIG. 6 is a flow diagram of the logical sequence of operation the intensity control system specifically for an intensified in CCD camera.

The control sequence of the system is best described referring to the flowchart in FIG. 6. At block 642, the entire image is reflected from the MMA 100 with all elements in the first energized position. At block 644, the image is directed to the intensified CCD camera 536. At block 646, the image information is sent from the intensified CCD camera 536 to the control module 530 to be compared to the established, predetermined threshold level pixel by pixel.

At block 648, it is determined by the control module if any pixels are saturated above the threshold level and therefore out of the predetermined range. The system output optics 534 are designed such that each element of the MMA 100 corresponds to one or a select, localized group of pixels of the intensified CCD camera 536. Therefore, if at block 648 it is determined that there are pixels out of the predetermined range, that specific area of the image follows the flowchart path to block 650 and subsequently to block 652. Here, the corresponding elements of the MMA 100 are set at their second energized position to deflect the saturated portion of the image along lightpath 538 to the light trap 540 for a predetermined time period, typically ranging from a fraction of a camera frame time to several frame times of the intensified CCD camera 536. After the predetermined time period expires, the elements are deflected back to the first energized position to recheck the saturation level of the image, as indicated by the return path to block 642.

Any elements of the MMA array 100 that correspond to pixels determined to be within the desired range remain in first energized position, as the flowchart returns to block 642, and the image is directed along lightpath 532 and is imaged on the intensified CCD camera 536 through the system output optics, 534. This control sequence is continuously repeated through out the imaging cycle. Although the intensified CCD camera, 536 is exposed to the saturated light for a frame time, or a fraction thereof, in order to determine the pixel areas that are out of range, it is not subjected to the negative effects of continuous illumination by light levels above the predetermined threshold. Note that in this embodiment, the CCD camera 536 serves two roles which is to both monitor and record/view the image. In its monitoring role, it sends information to the control module 530 that is then used to control deflection of the various micromirrors comprising 100. In its recording role, it is also the actual camera used for recording (and as desired, viewing) by the user.

Figure 7:
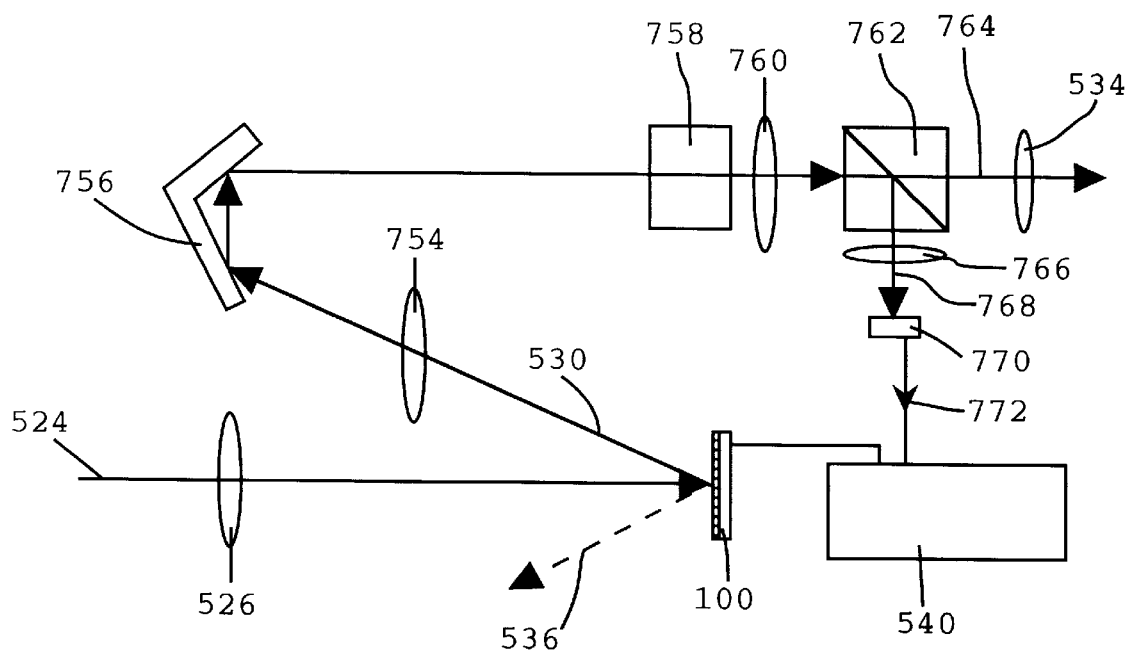
FIG. 7 is an optical schematic showing the propagation of an incident image through the intensity control system specifically for a direct viewing intensified optical system.

An alternative embodiment of the present invention is applying the design of the intensity control system described above to a direct viewing intensified optical system such as that used in night vision goggles. FIG. 7 shows the optical path for this alternative embodiment.

In FIG. 7, incident light 524 is imaged onto the MMA 100 by input optics 526. As controlled by the control module 540, the MMA 100 can deflect light into the optical system along primary light path 530 or away from the optical system along secondary light path 536. When deflected into the optical system along primary light path 530, the image is traversed through first system optics 754, and reflected by compound mirror set 756 to form on image intensifier 758. The intensified image is then traversed through second system optics 760 and split by beamsplitter 762 to viewing lightpath (viewing image) 764 and monitoring lightpath (monitoring image) 768. Viewing lightpath 764 is directed through output optics 534 to the user. Monitoring lightpath 768 is traversed through third system optics to a monitoring detector 770. The monitoring detector 770 is linked (772) to the control module 540 and is used to detect any areas with intensity above the established threshold value. The control module 540 then deflects the corresponding elements of the MMA 100 to their second energized position to direct light along light path 536.

Figure 8:
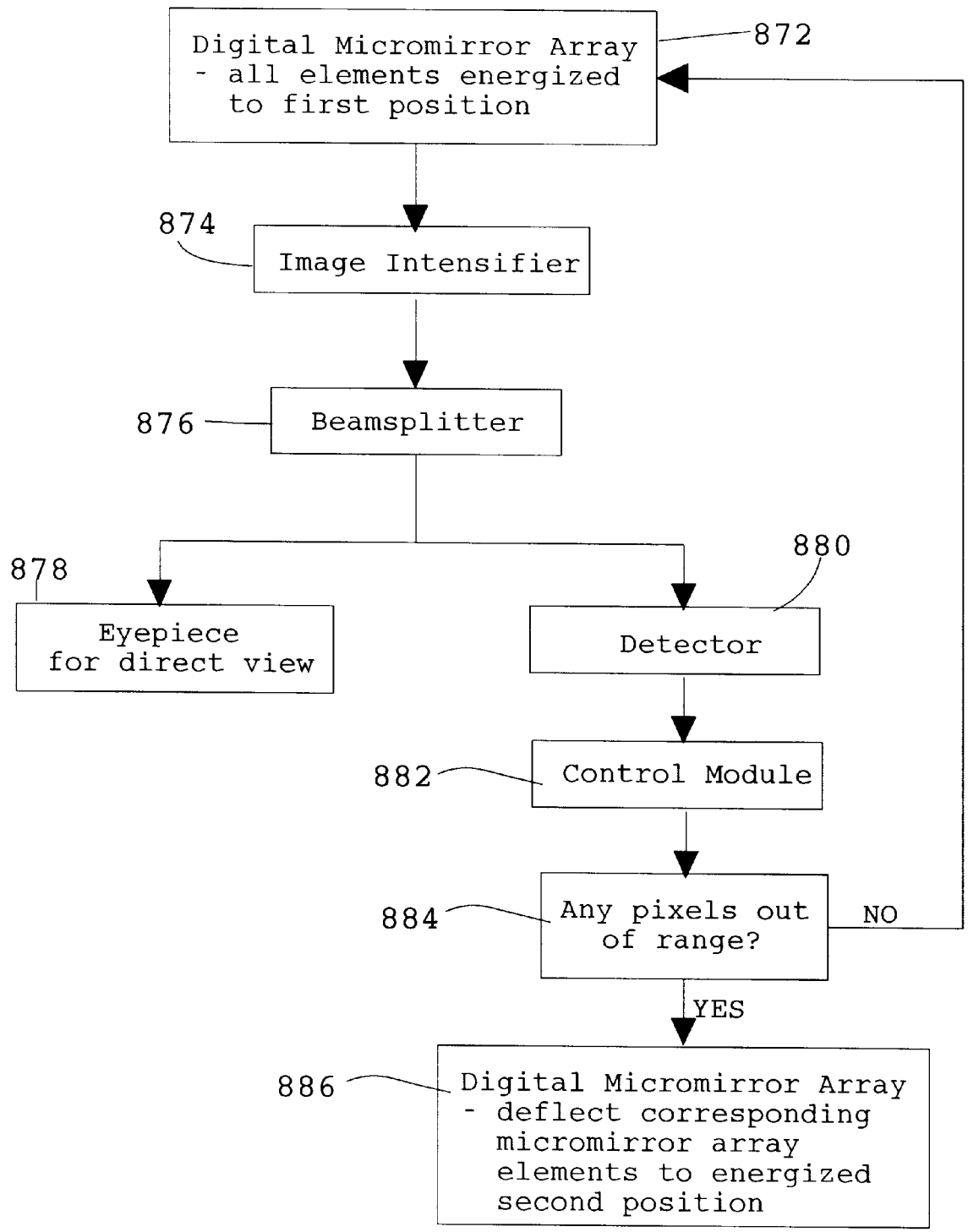
FIG. 8 is a flow diagram showing the logical sequence of operation in the intensity control system specifically for a direct viewing image intensified optical system.

The control sequence of the system is best described referring to the flowchart in FIG. 8. This flowchart is representative of one pass through the optical system. Its cycle is equivalent to the frame time of the detector 770. At block 872, all elements of the MMA are in the first energized position so as to deflect all incident light 524 along lightpath 530. In block 874, the image is then traversed through various system optical components, specifically to the first system optics 754 and compound mirror set 756, to the image intensifier 758. In block 876, the intensified image is then split by beamsplitter 762 into the direct viewing light path 764 and the monitoring lightpath 768. The direct viewing light path is represented by block 878. The monitoring light path begins at block 880 with the monitoring detector 770. The monitoring detector 770 can be a variety of real time camera formats. Most often, this monitoring detector 770 would be a CCD camera or a CMOS detector. Regardless of its specific format, its purpose is to provide pixel by pixel intensity information to the control module 540 to compare to an established, predetermined threshold level in substantially real time. This is demonstrated in blocks 882 and 884. The control module 540 decides if any pixels are out of range above the established threshold level. If there are no pixels out of range, the flowchart loop back to block 872, where all elements of the MMA are energized to the first position directing incident light 524 along lightpath 530. If there are pixels out of range above the established threshold level, the flowchart moves to block 886, where elements of the MMA 100 corresponding to out of range pixels on the monitoring detector 770 are deflected to the second energized position and portions of incident light 524 are deflected along light path 536. This cycle is repeated and therefore the elements of the MMA 100 reconfigured in a tme period set by the control module 540. This continuous updating will account for changing light conditions in the scene being viewed.

In this alternative embodiment of the present invention, the control module 540 is used to analyze the image information and determine if pixel values are above or below the predetermined threshold level. In response to this analysis, the control module 540 controls the deflection of the elements of the MMA by applying the necessary voltage. In addition, the control module 540 also controls the duty cycle of the deflected elements of the MMA 100. Based on the usage conditions, the control module 540 can be set in a predetermined manner to switch the entire image back to the monitoring detector 770 to check for saturation, within a single frame time for highly dynamic lighting conditions, or at any multiple of a single frame time for more static lighting conditions.

It is obvious to one skilled in the art that there are many variations of the optical setup of the alternative embodiment presented above. The most obvious one that is to be included within the scope of this disclosure is to place the image intensifier 758 after the monitoring detector 770 and the control module 540 in the optical train. In this configuration, the image is checked prior to intensification for areas above the designated threshold.

A second alternative embodiment of this invention can be applied to both the preferred embodiment and the first alternative embodiment of the improved intensity control system for intensified imaging systems. In this alternative embodiment the timing in which the saturated areas of the image are deflected away from the optical system is controlled within a single frame time in order to preserve image transmission without saturating the area. Since the intensity measurement is cumulative over an entire frame time, intensity levels can be reduced by exposing the pixels for a duration shorter than the frame time. This is known as reducing the dwell time. This alternative embodiment of the present invention require that the control module 540 be sophisticated enough such that the determination that a pixel or pixel area is out of the allowable range would include determining an appropriate dwell time based on the specific intensity measurement for that pixel or pixel area, so as not to saturate it. This alternative embodiment allows preservation of the entire image throughout the viewing sequence. The known technique of pulse width modulation may be used to achieve similar results.

The control module 540, in all embodiments, makes use of an appropriate combination of computer hardware and/or software to control the MMA 100 based on the light-intensity input information it receives from the system detectors (536 for both viewing and monitoring, 770 for monitoring-only). A broad spectrum of possibilities for designing the control module 540 for this purpose would be obvious to someone of ordinary skill, and are fully contemplated and encompassed by this disclosure and its associated claims.

Similarly, the specific layout of the optical systems can be altered and changed to best fit specific applications. The inclusion of components such as mirrors and lenses are meant to direct the optical system and are described above as an example of such a layout. Optical components such as these can be added to or taken away from the system without changing its basic purpose. The configuration of FIG. 5 in which the imaging device doubles as the detector can also be applied to a direct view system, while the configuration of FIG. 7 in which the imaging device is separate from the detector can also be applied to a camera recording system. Therefore a broad spectrum of possibilities for designing the specific optical layout for the implementation of the intensity control system would be obvious to someone of ordinary skill, and are fully contemplated and encompassed by this disclosure and its associated claims.

While a pixel by pixel analysis of an image to determine saturation is preferred, it is understood that it is also possible to examine a group of pixels in a localized region of the image as the basis for determining which micromirrors are to be deflected into their second energized position. The important point is that each micromirror will correspond to one or more image pixels, and that the pixel analysis— whether of a single pixel for a one-to-one correspondence of pixels to micromirrors, or of a plurality of pixels for a several-to-one correspondence of pixels to micromirrors—is fundamentally to determine which micromirrors are to be moved into their second energized position, and which are to remain unaltered in their first energized position.

While only certain preferred features of the invention have been illustrated and described, many modifications, changes and substitutions will occur to those skilled in the art. It is, therefore, to be understood that this disclosure and its associated claims are intended to cover all such modifications and changes as fall within the true spirit of the invention.

We claim:

1. A system for detecting and controlling localized image intensity, for use in an intensified optical imaging system, comprising:

micromirror array means further comprising an array of individually-controllable micromirrors, each of said micromirrors corresponding to and reflecting one of a plurality of localized regions of an input image reflected off of said micromirror array means as a reflected image, and each of said localized input image regions corresponding to at least one pixel of said input image;

monitoring detector means for detecting a light intensity of each of said localized regions of said reflected image and identifying any of said localized regions that are saturated to intensity above a predetermined threshold; and control module means for maintaining each micromirror for which the corresponding localized region is not so-identified to be above said threshold in a first energized position in which said corresponding localized region is reflected into imaging means through which said reflected image is to be imaged, and moving each micromirror for which the corresponding localized region is so-identified to be above said threshold into a second energized position in which said corresponding localized region is reflected away from said imaging means.

2. The system of claim 1, wherein said imaging means comprises said monitoring detector means.

3. The system of claim 1, further comprising beam splitting means for splitting said reflected image into a viewing image and a monitoring image; wherein:

said monitoring detector means is separate from said imaging means;

said monitoring image is directed by said beam splitting means into said monitoring detector means; and said viewing image is directed by said beam splitting means into said imaging means.

4. The system of claim 2, wherein said imaging means comprises an intensified camera, and so-imaging said reflected image comprises recording said reflected image using said intensified camera.

5. The system of claim 3, wherein said imaging means comprises an intensified camera, and so-imaging said reflected image comprises recording said reflected image using said intensified camera.

6. The system of claim 2, wherein said imaging means comprises an intensified image viewer, and so-imaging said reflected image comprises viewing said reflected image using said intensified image viewer.

7. The system of claim 3, wherein said imaging means comprises an intensified image viewer, and so-imaging said reflected image comprises viewing said reflected image using said intensified image viewer.

8. The system of claim 1, said control module further comprising dwell time means for:

determining an appropriate dwell time less than an entire frame time of said imaging means for the micromirror corresponding to each localized region that is so-identified to be above said threshold;

maintaining said corresponding micromirror in said first energized position for said appropriate dwell time; and moving said corresponding micromirror into said second energized position for a remainder of said frame time beyond said appropriate dwell time.

9. The system of claim 1, said control module further comprising duty cycle means for restoring the micromirror corresponding to each localized region that is so-identified to be above said threshold from said second energized position to said first energized position, at a predetermined time after said moving said micromirror into said second energized position.

10. A method for detecting and controlling localized image intensity, for use in an intensified optical imaging system, comprising the steps of:

detecting a light intensity of each of a plurality of localized regions of an input image reflected off of micromirror array means comprising an array of individually-controllable micromirrors, each of said micromirrors corresponding to and reflecting one of said plurality of said localized regions, and each of said localized input image regions corresponding to at least one pixel of said input image, using monitoring detector means;

identifying any of said localized regions that are saturated to intensity above a predetermined threshold, further using said monitoring detector means;

maintaining each micromirror for which the corresponding localized region is not so-identified to be above said threshold in a first energized position thereby reflecting said corresponding localized region into imaging means through which said reflected image is to be imaged, using control module means; and moving each micromirror for which the corresponding localized region is so-identified to be above said threshold into a second energized position thereby reflecting said corresponding localized region away from said imaging means, further using said control module means.

11. The method of claim 10, said imaging means further comprising said monitoring detector means.

12. The method of claim 10, further comprising the steps of:

splitting said reflected image into a viewing image and a monitoring image using beam splitting means;

directing said monitoring image into said monitoring detector means via said beam splitting means; and directing said viewing image into said imaging means via said beam splitting means; wherein said monitoring detector means is separate from said imaging means.

13. The method of claim 11, further comprising the step of so-imaging said reflected image by recording said reflected image using imaging means comprising intensified camera means.

14. The method of claim 12, further comprising the step of so-imaging said reflected image by recording said reflected image using imaging means comprising intensified camera means.

15. The method of claim 11, further comprising the step of so-imaging said reflected image by viewing said reflected image using imaging means comprising an intensified image viewer.

16. The method of claim 12, further comprising the step of so-imaging said reflected image by viewing said reflected image using imaging means comprising an intensified image viewer.

17. The method of claim 10, further comprising the steps of:

determining an appropriate dwell time less than an entire frame time of said imaging means for the micromirror corresponding to each localized region that is so-identified to be above said threshold using dwell time means of said control module;

maintaining said corresponding micromirror in said first energized position for said appropriate dwell time further using said dwell time means of said control module; and moving said corresponding micromirror into said second energized position for a remainder of said frame time beyond said appropriate dwell time further using said dwell time means of said control module.

18. The method of claim 10, further comprising the steps of:

restoring the micromirror corresponding to each localized region that is so-identified to be above said threshold from said second energized position to said first energized position, at a predetermined time after said moving said micromirror into said second energized position, using duty cycle means of said control module.

19. A method for detecting and controlling localized image intensity, for use in an intensified optical imaging system, comprising the steps of:

deflecting a reflection of each of a plurality of localized regions of an input image which is detected and identified to be saturated to an intensity above a predetermined threshold, away from imaging means through which said reflected image is to be imaged; and allowing a reflection of each of said plurality of localized regions of said input image which is detected and identified to not be saturated to an intensity above said predetermined threshold, into said imaging means.

* * * * *